United States Patent
Clarke et al.

(10) Patent No.: US 10,176,172 B1
(45) Date of Patent: Jan. 8, 2019

(54) MATCHING INSURANCE POLICY RELATED OBJECTS

(75) Inventors: Geoffrey Clarke, Foster City, CA (US); Solomon In Kwon, Santa Clara, CA (US); Douglas E. McCreary, Belmont, CA (US); Kenneth William Jones, Jr., Foster City, CA (US)

(73) Assignee: Guidewire Software, Inc., Foster City, CA (US)

( * ) Notice: Subject to any disclaimer, the term of this patent is extended or adjusted under 35 U.S.C. 154(b) by 320 days.

(21) Appl. No.: 13/432,781

(22) Filed: Mar. 28, 2012

(51) Int. Cl.
*G06F 17/30* (2006.01)
*G06Q 40/00* (2012.01)

(52) U.S. Cl.
CPC .................................. *G06F 17/30* (2013.01)

(58) Field of Classification Search
CPC ........................................................ G06F 17/30
USPC .............................................................. 705/4
See application file for complete search history.

(56) References Cited

U.S. PATENT DOCUMENTS

| | | | | |
|---|---|---|---|---|
| 6,279,007 | B1* | 8/2001 | Uppala | G06F 17/30961 |
| 7,478,087 | B2* | 1/2009 | Lin | G06F 17/30448 |
| 7,533,112 | B2* | 5/2009 | Beatty | G06F 17/30587 |
| 8,601,029 | B2* | 12/2013 | Anand | G06F 17/30575 |
| | | | | 707/802 |
| 2006/0149784 | A1* | 7/2006 | Tholl | G06Q 10/10 |
| 2007/0214020 | A1* | 9/2007 | Srinivasan et al. | 705/4 |
| 2007/0226187 | A1* | 9/2007 | Beatty | G06F 17/30587 |
| 2008/0114766 | A1* | 5/2008 | Asmi | G06F 17/30997 |
| 2008/0243967 | A1* | 10/2008 | Bhatia | G06F 17/30489 |
| 2009/0006139 | A1* | 1/2009 | Wait | G06Q 40/08 |
| | | | | 705/4 |
| 2012/0323859 | A1* | 12/2012 | Yasa | G06F 17/30156 |
| | | | | 707/692 |
| 2012/0323860 | A1* | 12/2012 | Yasa | G06F 17/30156 |
| | | | | 707/692 |
| 2013/0151537 | A1* | 6/2013 | Woody | G06F 17/30572 |
| | | | | 707/748 |

OTHER PUBLICATIONS

Database System Concepts Sixth Edition Avi Silberschatz Henry F. Korth S. Sudarshan McGraw-Hill; ISBN 0-07-352332-1, Jan. 28 2010; Appendix E.*

Efficient Similarity Search for Tree-Structured Data by Li, Liu, Feng and Zhou, 2008.*

Christine Parent and Stefano Spaccapietra; Issues and Approaches of Database Integration; Communications of the ACM; vol. 41, Issue 5, pp. 166-178 (May 1998).*

(Continued)

*Primary Examiner* — Virpi H Kanervo
(74) *Attorney, Agent, or Firm* — Van Pelt, Yi & James LLP

(57) ABSTRACT

A technique of insurance policy includes obtaining a plurality of hierarchical graphs representing a plurality of insurance policies, wherein each of the hierarchical graphs comprises a plurality of insurance policy related objects. It further includes obtaining a set of matching criteria, including a type of insurance related object to be matched and an identifier associated with the type of insurance related object to be matched. It also includes determining whether an insurance related object in one of the plurality of graphs matches another insurance related object in another one of the plurality of graphs using the set of matching criteria.

18 Claims, 12 Drawing Sheets

(56) References Cited

OTHER PUBLICATIONS

Zhang et al.; Multi-Database Mining; IEEE Computational Intelligence Bulletin, vol. 2, No. 1, pp. 5-13 (Jun. 2003).*
Fan et al.; Discovering and Reconsiling Value Conflicts for Numerical Data Integration; Information Systems, vol. 26, pp. 635-656 (2001).*

* cited by examiner

Personal Vehicles Table

| VehicleID | Make | Model | Year | Color | License Plate Num | VIN | Policy Period |
|---|---|---|---|---|---|---|---|
| 0001 | Honda | NSX Type-R | 2003 | Championship White | DRFTNSX | NSXR1337 | 1/1/2012-1/1/2013 |
| 0002 | Mazda | RX-7 | 2002 | Yellow | FD3SRX7 | MZRX7FD | 1/1/2012-1/1/2013 |
| 0003 | Subaru | Impreza 22B STi | 1998 | Blue | 22BSTI | GC8E2SD | 6/1/2012-1/1/2013 |
| 0004 | Toyota | AE86 | 1987 | White/Black | FTSAE86 | TYTAE86 | 1/1/2012-1/1/2013 |
| 0005 | Mitsubishi | Lancer Evolution VI (TME) | 1999 | Red | LANEVO6 | EVOTME6 | 8/1/2012-1/1/2013 |

Policy Driver (421)

| Name | SSN | Driver's License Number | Policy Period |
|---|---|---|---|
| Ayrton Senna | 1111 | D12341 | 1/1/2012-1/1/2013 |
| Ryosuke Takahashi | 2222 | D12342 | 1/1/2012-1/1/2013 |
| Bunta Fujiwara | 3333 | D12343 | 1/1/2012-1/1/2013 |
| Takumi Fujiwara | 4444 | D12344 | 1/1/2012-1/1/2013 |
| Tommi Makinen | 5555 | D12345 | 1/1/2012-1/1/2013 |

FIG. 4B

Vehicle Driver(s) for Personal Vehicle 0001 (NSXR1337) Join Table (441)

| Vehicle Driver ID | Driver Name | Policy Period | Percentage |
|---|---|---|---|
| A | Ayrton Senna | 1/1/2012-1/1/2013 | 100% |

FIG. 4C

Vehicle Driver(s) for Personal Vehicle 0004 (TYTAE86) Join Table (461)

| Vehicle Driver ID | Driver Name | Policy Period | Percentage |
|---|---|---|---|
| A | Bunta Fujiwara | 1/1/2012-1/1/2013 | 57% |
| B | Takumi Fujiwara | 1/1/2012-1/1/2013 | 43% |

FIG. 4D

Personal Vehicles Table as of 1/1/2012

| VehicleID | Make | Model | VIN | Policy Start | Policy End |
|---|---|---|---|---|---|
| 0001 | Toyota | AE86 | TYTAE86 | 1/1/2012 | 1/1/2013 |

FIG. 7A

Personal Vehicles Table as of 3/1/2012

| VehicleID | Make | Model | VIN | Policy Start | Policy End |
|---|---|---|---|---|---|
| 0001 | Toyota | AE86 | TYTAE86 | 1/1/2012 | 1/1/2013 |
| 0002 | Subaru | Impreza 22B STi | GC8E2SD | 6/1/2012 | 1/1/2013 |

FIG. 7B

Personal Vehicles Table as of 5/1/2012

| VehicleID | Make | Model | VIN | Policy Start | Policy End |
|---|---|---|---|---|---|
| 0001 | Toyota | AE86 | TYTAE86 | 1/1/2012 | 1/1/2013 |
| 0002 | Subaru | Impreza 22B STi | GC8E2SD | 6/1/2012 | 1/1/2013 |
| 0003 | Subaru | Impreza 22B STi | GC8E2SD | 5/14/2012 | 1/1/2013 |

| Version A | Version B | Version C |
|---|---|---|
| Bunta Only | Bunta and Takumi 1 | Bunta and Takumi 2 |
| Total = $150 | Total = $250 | Total = $200 |
| Toyota AE86 | Toyota AE86 | Toyota AE86 |
| Driver: Bunta | Driver: Bunta | Driver: Bunta |
| -- | Driver: Takumi | -- |
| -- | Subaru Impreza 22B STi | -- |
|  | Driver: Bunta |  |

FIG. 11

MATCHING INSURANCE POLICY RELATED OBJECTS

BACKGROUND OF THE INVENTION

Insurance policies are typically generated or modified by a customer (also referred to as the insured) through an insurance agent. During the process of generating or modifying policies, inconsistencies such as data duplicates and other data conflicts may arise and need to be resolved. The typical system today requires the insurance agent to manually review and detect any inconsistencies. The manual process, however, is not reliable. It would be useful to have an automated technique to reliably detect and resolve data conflicts in insurance policies.

In addition, there are many higher level features that are related to the ability to detect and resolve conflicts. For example, a customer may wish to consider different coverage options (e.g., different cars, different drivers for different automobile policy configurations) and compare them. As another example, the insurance carrier may wish to permit merging of policies that are to be combined or overlap (e.g., due to marriage, companies merging businesses together, duplicate policies that are inadvertently created). In existing systems today, since configuration and comparison of policies can be difficult, these features are not easily implemented.

BRIEF DESCRIPTION OF THE DRAWINGS

Various embodiments of the invention are disclosed in the following detailed description and the accompanying drawings.

FIG. 4A is a data structure diagram illustrating an embodiment of a database representation of Personal Vehicles covered under a policy.

FIG. 4B is a data structure diagram illustrating an embodiment of a database representation of Policy Drivers associated with a policy.

FIG. 4C is a data structure diagram illustrating an embodiment of a database representation of a vehicle driver table associated with a particular personal vehicle.

FIG. 4D is a data structure diagram illustrating an embodiment of a database representation of a vehicle driver table associated with a particular personal vehicle.

FIG. 7A is an example of a first state of a Personal Vehicles Table.

FIG. 7B is an example of a second state of a Personal Vehicles Table.

FIG. 7C is an example of a third state of a Personal Vehicles Table.

FIG. 11 is an example user interface displaying three policy versions.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method for matching insurance related policy related objects are disclosed.

Figure 1:
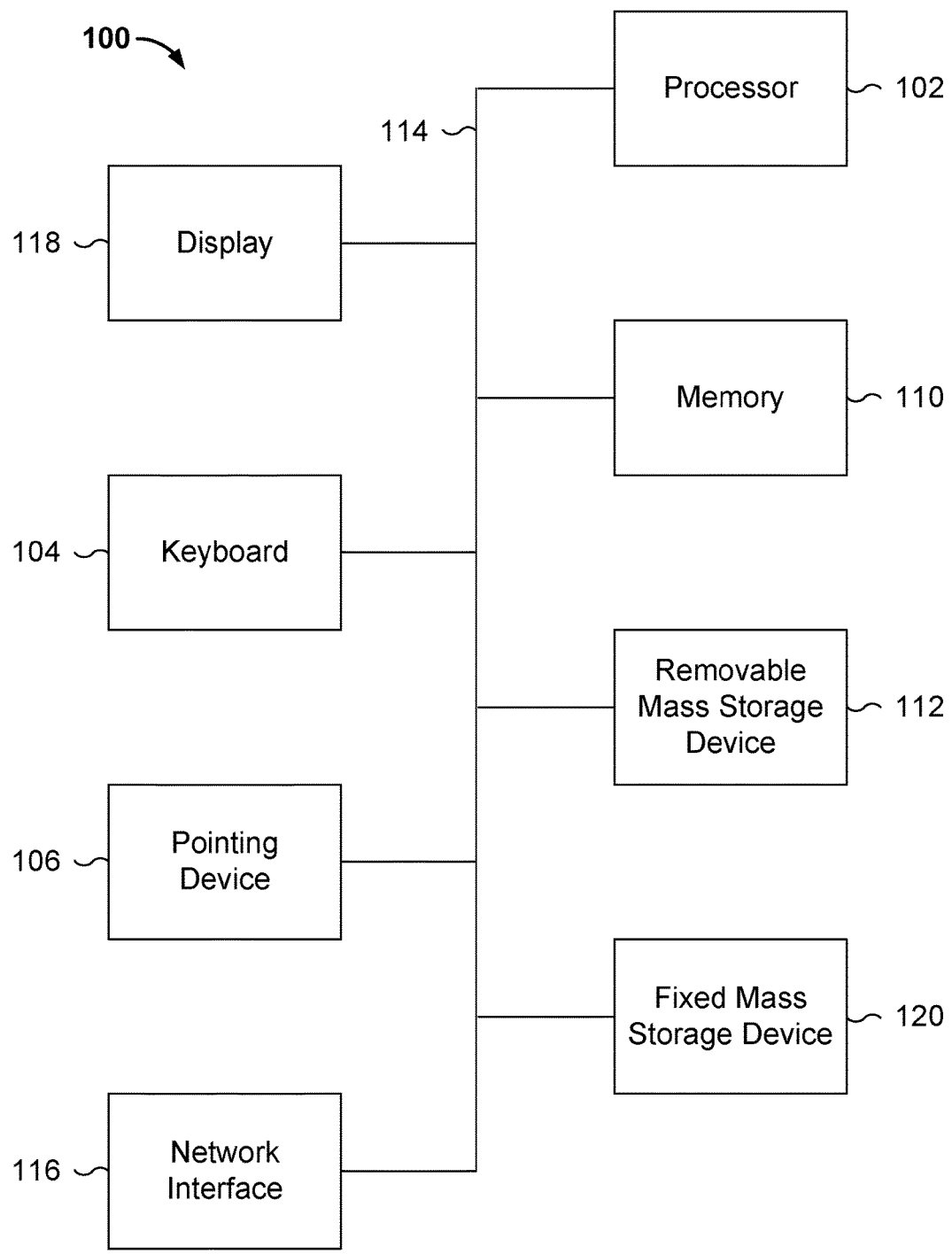
FIG. 1 is a functional diagram illustrating an embodiment of a programmed computer system for performing matching of insurance policy related objects.

FIG. 1 is a functional diagram illustrating an embodiment of a programmed computer system for performing matching of insurance policy related objects. As will be apparent, other computer system architectures and configurations can be used to perform matching of insurance policy related objects. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide quotes for insurance policies.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer-readable medium is any data storage device that can store data which can thereafter be read by a computer system. Examples of non-transitory computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
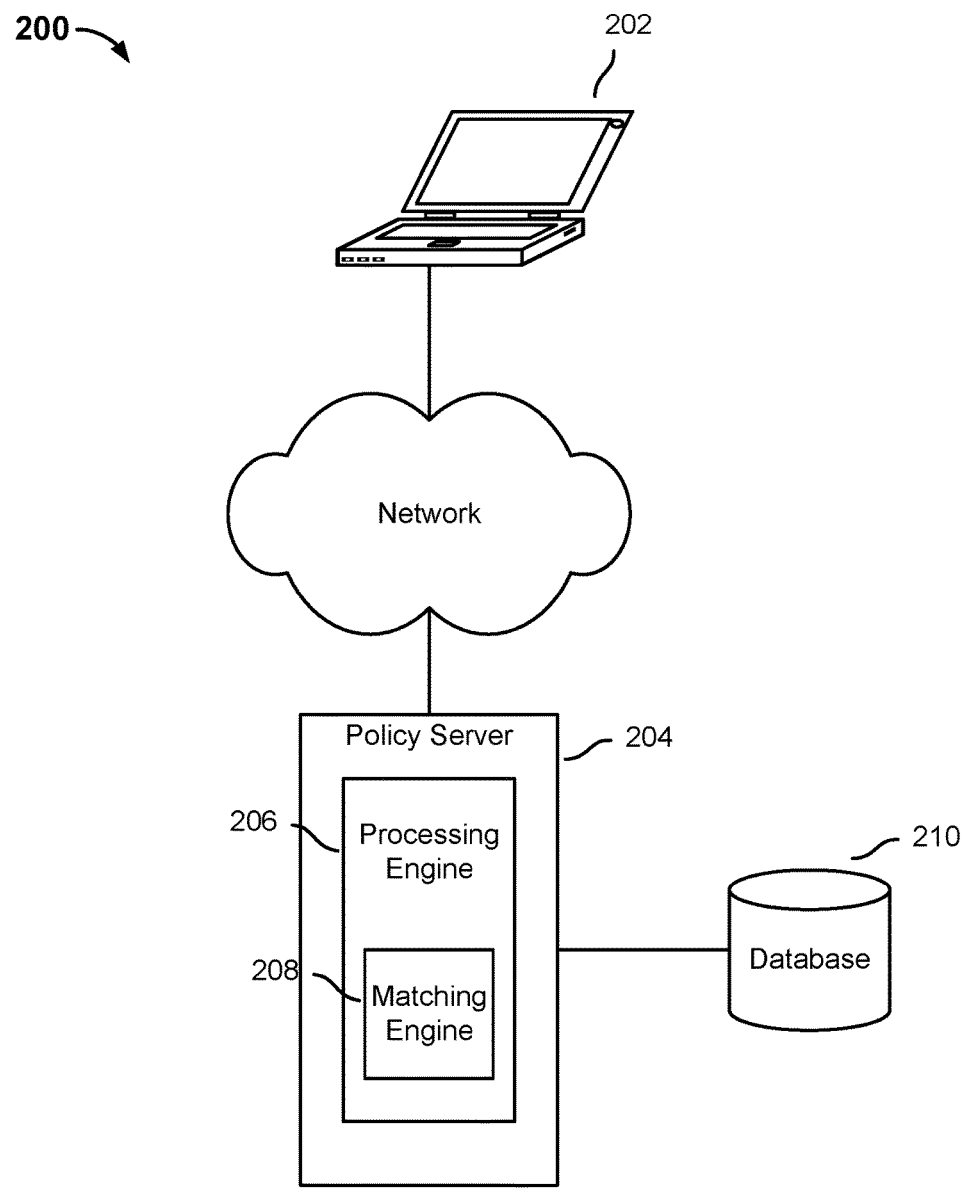
FIG. 2 is a system diagram illustrating an embodiment of a system for processing an insurance policy.

FIG. 2 is a system diagram illustrating an embodiment of a system for processing an insurance policy. In this example, a client device 202 communicates with a policy management platform via a network. Examples of device 202 include a laptop computer, a desktop computer, a smart phone, a mobile device, a tablet device or any other computing device. As shown, device 202 is configured to communicate with the policy management platform, which includes policy server 204, processing engine 206, matching engine 208, and database 210. In various embodiments, an application such as a web-browser or a client application is installed at device 202 to enable communication with the platform. In this example, policy server 204 has logic for handling insurance policies, including generating policy offerings, receiving updates, resolving conflicts, merging policies, copying policies, determining differences between policies, archiving policy versions and quotes in database 210, etc. In this example, processing performed by policy server 204 is performed by processing engine 206, which utilizes matching engine 208 in various insurance related higher level processes. Other configurations are possible. For example, in some embodiments, the matching engine is implemented at the client.

In various embodiments, the matching engine is used to facilitate various higher level processing involving insurance related policy objects associated with an insurance policy, such as conflict resolution (e.g., resolving duplicate additions, pre-emption), merging, supporting side-by-side quote generation, copying, and differentiating.

In some embodiments, an insurance policy includes policy lines and risk units (e.g., coverables and covered items that are insured by the policy) that are covered under the insurance policy. In some embodiments, a policy line (also referred to as a line of business in some embodiments) describes a set of coverages that apply to a particular business operation. In various embodiments, policy lines include personal auto, business auto, crime, general liability, commercial property, inland marine, or any other appropriate policy line or line of business. In some embodiments, a policy line includes associated risk units and covered items, which are covered under the policy, and which may be associated with a specific policy line. For example, an auto policy line may include risk units/covered items such as personal vehicles which are covered by coverages (e.g., liability, collision, autoglass, etc.) under an automotive policy line of a policy. A commercial property policy line may be associated with a property (e.g., building) risk unit type/covered item. In some embodiments, both individual risk units and a policy line as a whole may be associated with coverages.

In some embodiments, a policy is implemented in an object oriented insurance policy system. In some embodiments, a policy is represented as a graph of connected objects with metadata describing the structure and contents of the objects. In some embodiments, a policy graph represents all database information that represents the policy in effective time. In some embodiments, all database information included in a policy graph is effective date aware (e.g., are associated with effective dates during which they are in force). In some embodiments, policy information included in a graph includes coverables and covered items (e.g., objects that are insured), rules on perils (e.g., natural disasters), coverages, limits, deductibles, contacts, base contract information, contracts, forms, or any other appropriate policy information that is effective date aware. In some embodiments, a policy graph references information and data associated with the policy that are not associated with effective times, are not effective date aware, or are otherwise date agnostic (e.g., legal contractual information, administrative information, phone numbers, email addresses, etc.). In some embodiments, effective time comprises a period over which the information is effective or in force and includes start and expiration times. In some embodiments, a policy graph comprises a hierarchical tree data structure that represents policy contract information represented across effective time.

Figure 3:
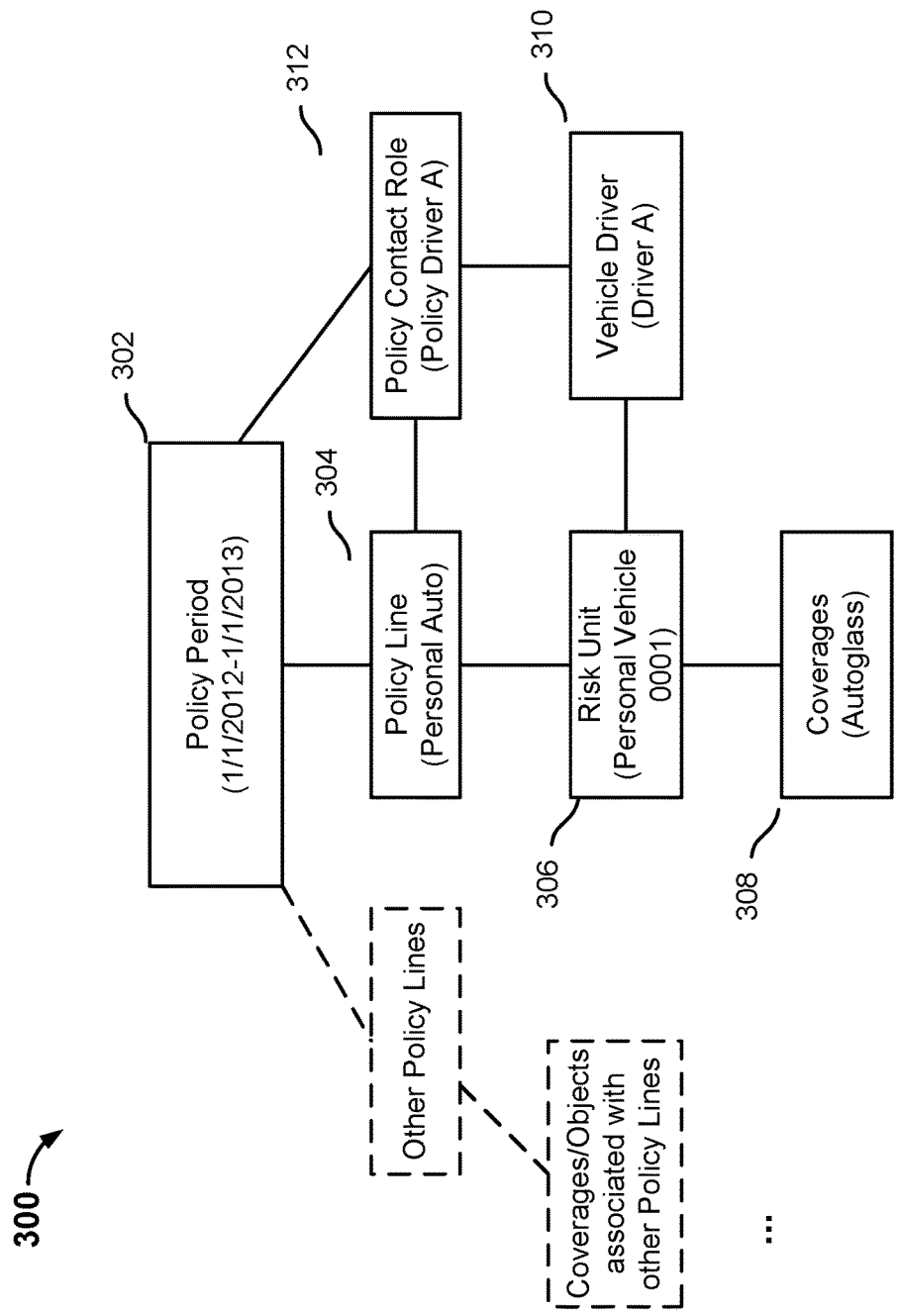
FIG. 3 is a data structure diagram illustrating an embodiment of a graph representation of a policy.

FIG. 3 is a data structure diagram illustrating an embodiment of a graph representation of a policy. In this example, a policy including a personal auto policy line is shown.

In some embodiments, the root node of the hierarchical graph/tree corresponds to a policy period (e.g., Policy Period 302). In some embodiments, policy period 302 indicates an overall period of time over which the policy represented by the policy graph is effective or in force. In some embodiments, the policy period object includes a start date (e.g., Jan. 1, 2012) and an end/expiration date (e.g., Jan. 1, 2013). In some embodiments, objects in the policy graph are also associated with effective periods that are sub-periods or portions of the overall effective period of the policy (e.g., new car added midway through overall effective period). In some embodiments, a policy graph represents some or all information stored in a database (e.g., relational or non-relational database) that represents a policy in effective time (e.g., all information that is effective at a time of interest).

In some embodiments, the next level of a graph hierarchy comprises policy lines (e.g., personal auto, home, commercial property, etc.). In this example, Policy object 304 comprises a personal auto policy line object.

In some embodiments, the next level of a graph hierarchy comprises covered items and risk units (e.g., a particular vehicle or a particular property covered by the insurance policy). For example, policy object 306 comprises a risk unit object covered under the policy and associated with a policy line. An example of a risk unit object associated with a personal auto policy line is an object representing a personal vehicle, such as Personal Vehicle 0001 shown here.

In some embodiments, the next level of the hierarchical graph comprises coverages (e.g., liability, deductibles, towing, etc.). In this example, policy object 308 comprises a coverage object. An example of a coverage object is an object representing autoglass, collision, or any other appropriate coverage, such as the autoglass coverage object associated with Personal Vehicle 0001 shown here.

Policy object 310 comprises a vehicle driver object. In some embodiments, a vehicle driver object comprises an object representing a driver who drives a particular personal vehicle, such as Vehicle Driver A, who is a driver of Personal Vehicle 0001. In some embodiments, a personal vehicle is driven by more than one vehicle driver. In some embodiments, a vehicle driver object is associated with a policy driver object.

Policy object 312 comprises a policy driver object. In some embodiments, a policy driver object comprises an object representing a driver who is insured and who is associated with personal vehicles covered under the policy. In some embodiments, a policy driver is a driver on more than one personal vehicle covered under the policy. In some embodiments, a policy driver is a type of policy contact role which includes contract/effective data aware data. In some embodiments, policy contact roles refer to a type of account contact role, which includes date-agnostic data. For example, a policy driver refers to the "Driver" type of account contact role. In some embodiments, an account contact role comprises a type of role a contact on an account associated with the policy can have, such as a driver, or any other appropriate role, such as the primary insured, secondary insured, or as an entity with an additional interest (e.g., on a commercial property).

In the example of FIG. 3, an auto policy line and policy objects associated with an auto policy line were shown. However, in some embodiments, a policy is associated with a plurality of different policy lines (e.g., a policy including a package of policy lines, such as auto and homeowner policy lines), with each policy line having associated policy objects (e.g., covered items and coverages specific each policy line).

In various embodiments, a policy graph references job objects (e.g., job opened by insurance agent to create policy), policy term objects (e.g., contractual terms of policy), account location object (e.g., indicating that policy is associated with a location, such as a state), contacts object, or any other appropriate object.

In some embodiments, each object in a policy graph is associated with a table, a row in a table, a column in a table, an entry in a table, an array, or any other appropriate data structure. In some embodiments, information associated with a policy is stored in a relational database. In some embodiments, information associated with a policy is stored as text, xml, in a non-relational database, or any other appropriate data structure. In some embodiments, the structure of the data is described using metadata. For example, metadata is used to define and automatically create database tables (e.g., the Personal Vehicles Table shown in FIG. 4A).

For example, metadata associated with the Personal Vehicle Type describes properties of the type and define that the Personal Vehicle Type includes a String column "VIN," typelist value "make," typelist value "model," number representing "year," currency value representing "cost new," etc., which in some embodiments, correspond to columns of a database table.

FIGS. 4A-D are data structure diagrams illustrating database representations of various policy objects.

FIG. 4A is a data structure diagram illustrating an embodiment of a database representation of Personal Vehicles covered under a policy. In some embodiments, a personal vehicle risk unit or covered item object (e.g., Personal Vehicle 0001 object 306 of FIG. 3) is associated with a row in a table of Personal Vehicles. In some embodiments, information associated with a particular vehicle, such as make, model, year, color, license plate, VIN, cost new, policy period (i.e., indicating period over which vehicle is covered), or any other appropriate information is stored in the table. In some embodiments, the structure of the table (e.g., columns) is defined using metadata.

In some embodiments, the above personal vehicles table comprises a table of risk units. In some embodiments, a coverage object is also associated with a coverage pattern table. In some embodiments, a coverage pattern table describes the possible coverages that make up a policy. In some embodiments, information associated with coverages on a policy is stored in the table, with the structure of the table defined using metadata.

FIG. 4B is a data structure diagram illustrating an embodiment of a database representation of Policy Drivers associated with a policy. In some embodiments, a policy driver object (e.g., Policy Driver object 314 of FIG. 3) is associated with a row in a table of Policy Drivers. In some embodiments, information associated with a particular driver, such as name, driver's license number, age, Social Security Number, address, policy period, or any other appropriate information is stored as metadata fields associated with the particular driver. In some embodiments, policy drivers are a subset of contacts associated with an account that the policy is associated with. In some embodiments, the policy drivers table refers to a second table (such as a table for account contacts roles or account contacts) through a foreign key.

FIGS. 4C-D are data structure diagrams illustrating embodiments of database representations of vehicle driver tables associated with two different personal vehicles. In some embodiments, a vehicle driver(s) table comprises a join table that includes common properties (e.g., common fields) associated with two or more tables (e.g., personal vehicles table 401 and policy drivers table 421) that link them together. In some embodiments, a vehicle driver(s) table for a particular vehicle includes the names of one or more entities driving the particular vehicle, the policy period of the one or more drivers (e.g., when driver is covered on policy for the vehicle), as well as respective percent utilization of the particular vehicle by its one or more drivers. In some embodiments, the sum utilization of a particular vehicle at any point in the effective period of the particular vehicle must sum to 100%. Any other appropriate information associated with a vehicle driver(s) table may be included.

In some embodiments, information associated with policies is stored in database tables, arrays, or in any other appropriate data structure. In some embodiments, information associated with policies is stored in a relational database. In some embodiments, tables are linked through join tables or any other appropriate association. In some embodiments, tables refer to one or more tables using foreign keys or any other appropriate referential association. In some embodiments, indicated relationships are represented efficiently by a combination of direct foreign keys and indirect (e.g., via a join table) foreign keys to provide the ability for multiple coverage patterns to be associated with a particular risk unit type, for example (e.g., autoglass and comprehensive coverage for a personal vehicle).

In some embodiments, conflicts that may arise during processing involving policy objects (e.g., additions of duplicate objects) are prevented or resolved through the invocation of a matching engine. Duplicates may arise in a variety of scenarios involving processing of policy objects, and a system for matching insurance policy related objects provides a flexible and clean way by which to manage the structure of graphs and the objects within them.

Figure 5:
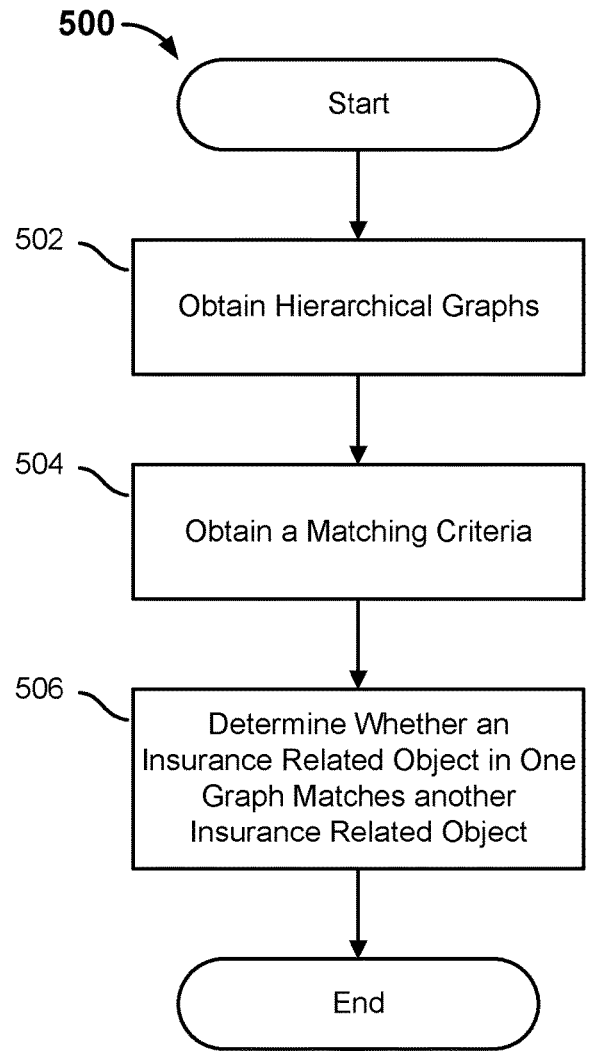
FIG. 5 is a flow diagram illustrating an embodiment of a process for matching insurance policy related objects.

FIG. 5 is a flow diagram illustrating an embodiment of a process for matching insurance policy related objects. In some embodiments, the process of FIG. 5 is executed by matching engine 208 of FIG. 2. In some embodiments, the matching process and its associated steps are invoked automatically by a higher level process, in response to a user interaction (e.g., user request), or by any other appropriate mechanism. In 502, one or more hierarchical graphs are obtained. In some embodiments, insurance related objects and their associated hierarchical graphs are obtained. An example of a hierarchical graph is the graph described in FIG. 3. In some embodiments, the hierarchical graphs are obtained automatically or are specified by a user (e.g., insurance agent or customer). In some embodiments, the hierarchical graphs are obtained automatically based on the type of processing that the matching engine is being invoked to support (e.g., duplicate object or policy removal/avoidance, pre-emption, side-by-side, merging, copying, differentiating).

In 504, matching criteria are obtained. In some embodiments, matching criteria are obtained automatically, are designated by a user, or are obtained through any other appropriate manner.

In some embodiments, matching criteria are specified for a given type of insurance policy related object to be matched. In some embodiments, matching criteria define the attributes and characteristics along which objects of the given type must match on in order to be considered matching objects. In some embodiments, parent columns and identity columns comprise distinct defining criteria for a given type of object to be matched. In some embodiments, parent columns define a list or set of foreign keys (e.g., "parent" entities of the given object type) that must match for an object of the given type to be considered a match. In some embodiments, identity columns define a list or set of regular fields (e.g., Strings, numbers, typekey values, etc.) that must match for an object of the given type to be considered a match. In some embodiments, identity columns correspond to columns in database tables (e.g., VIN column for Personal Vehicles). In some embodiments, a definition of matching for an object of a given type defines a set of zero or more parent columns and a set of one or more identity columns. In some embodiments, a parent column is not specified (e.g., for top level objects). For example, in some embodiments, Personal Vehicles comprise a top level object (e.g., does not have parent entities), and when matching objects of type Personal Vehicle, no parent columns are specified, and only the VIN identity column is used. For example, a VIN uniquely identifies vehicles, and so different vehicles can be distinguished from each other solely based on VIN. In this example, three characteristics have been defined: (1) type of object to be matched (Personal Vehicle), (2) set of Parent Columns (None), and (3) set of Identity Columns (VIN). However, in some cases, a given type of object may not be distinguishable (e.g., not unique) from another object without further specifying a parent. Personal Vehicle Coverage for a specific vehicle is an example. In this example, the three characteristics defining a match comprise: (1) type of object to be matched (Personal Vehicle Coverage), (2) set of Parent Columns (Foreign Key to a specific Personal Vehicle—e.g., with VIN: 1234), (3) set of Identity Column (Coverage Pattern—e.g., "autoglass"). In this example, being able to specify the parent as matching criteria for the given object type enables the matching process to distinguish "Autoglass Coverage" on a first vehicle from "Autoglass Coverage" on a second vehicle (e.g., because the parent columns corresponding to the vehicles are different). In another example, "Comprehensive Coverage" on one vehicle in a first graph can be determined to be the same "Comprehensive Coverage" on the same vehicle in the second graph because the three defining criteria of: (1) object type (Personal Vehicle Coverage), (2) set of Parent Columns (Foreign Key to specific Personal Vehicle), and (3) set of identity columns (Comprehensive Coverage), all match.

In some embodiments, matching criteria include generated keys (e.g., derived from hashes of information). In some embodiments, generated keys are used to optimize the performance of the matching process. For example, a generated key for a Personal Vehicle may be the last four digits of the VIN. For example, a first VIN 111114567 and a second VIN 222229876 would have generated keys of 4567 and 9876, respectively. Based on the generated keys, it can be quickly determined that the two personal vehicles are not a match. However, if the VIN of a first vehicle is 111114567 and the VIN of a second vehicle is 222224567, the generated keys for the two vehicles will be the same (4567). In this case, because the generated keys match, it is necessary to perform further processing to determine whether the two vehicles are actually the same or not. In this way, non-matches can be identified quickly and efficiently by using generated keys instead of potentially having to follow a chain of match requests (i.e., objects along chain specified by foreign keys must be checked to determine whether they match based on matching criteria) through the foreign keys of the parent columns.

In some embodiments, a specific value for a field is specified (e.g., to find objects with specific VIN) or as an unspecified value (e.g., to find any objects with matching VIN in retroactive duplicate removal). In some embodiments, a search to find matching objects begins from identified parent objects and further searches through child objects of the parent object as well as searching through referred objects and tables based on foreign keys specified in the parent column.

In some embodiments, parent and identity columns are specified at the metadata layer, for example, using metadata that describe or otherwise indicate that a property of an object type or a foreign key associated with the object type comprises a parent column or an identity column. For example, metadata describing properties of the Personal Vehicle Type may specify that a Personal Vehicle has or is associated with a String column property "VIN" that comprises an identity column. In another example, a foreign key to a parent Personal Vehicle may be specified as a parent column of a Coverage Pattern associated with the parent Personal Vehicle. In this example, in some embodiments, the VIN is specified as an identity column for the Parent Column Personal Vehicle. In some embodiments, the VIN is specified in metadata and used to match Parent objects (Personal Vehicles) during the matching process. In some embodiments, columns, properties, or foreign keys of object types are indicated as comprising default parent or identity columns or default merge criteria. In some embodiments, parent and identity columns are specified, designated, or otherwise defined by higher level processing. In some embodiments, parent and identity columns are specified, designated, or otherwise defined by a user.

In some embodiments, the ability to specify matching criteria provides a flexible mechanism by which to define what a match comprises. As an example, two account contacts objects may be identified as matching if they are associated with identical social security numbers (SSNs) (specified by the matcher), even if other fields do not match (e.g., one is named "Steve" while the other is named "Steven"). This can help to identify duplicate contacts.

In 506, it is determined whether a first insurance policy related object in one of the plurality of graphs matches a second insurance policy related object. In some embodiments, the second insurance policy related object is included in the same graph as the first insurance policy related object. In some embodiments, the second insurance policy related object is included in a graph different from the one including the first insurance policy related object. In some embodiments, all possible comparisons between all objects of a given type (or specified in parent columns) in the graph(s) are iterated over to determine matches (e.g., to find all possible matches). In some embodiments, only a subset of objects from the graph(s) is processed (e.g., to find objects that match with a specific object to be matched to). In some embodiments, the determination is made based on a look-up, search, or scan of the specified matching criteria (e.g., parent and identity columns for a given type of object) in a database of insurance policy related information. In some embodiments, objects are determined to be matched if objects matching all attributes and characteristics specified in the parent columns and identity columns match. For example, if only VIN is included as an identity column, two cars may be determined to be matched based on their VIN, even if other fields (not specified as identity columns) are different (e.g., color is different between two cars due to input error).

In some embodiments, the matching process described in FIG. 5 includes returning the objects or references to the objects determined to be matched as output.

Figure 6:
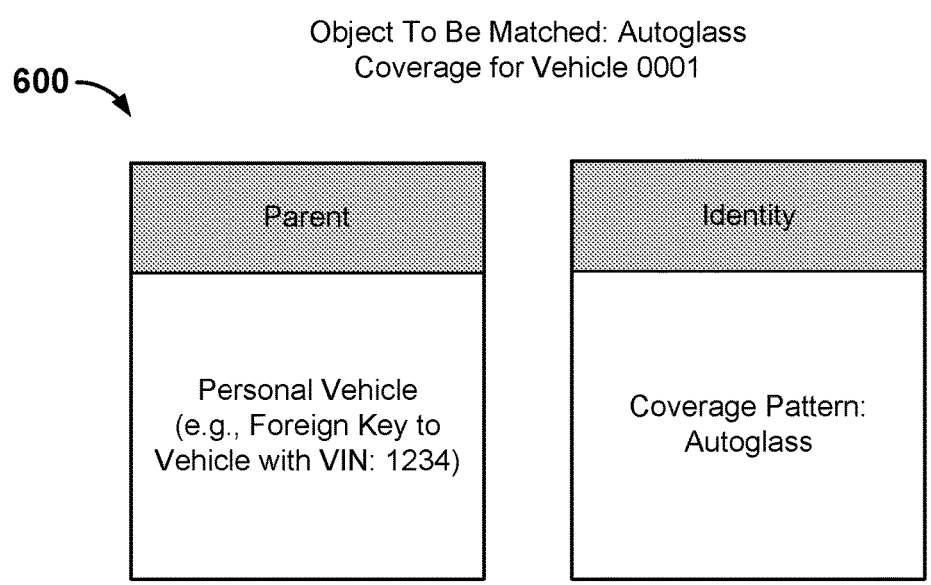
FIG. 6 is a data structure diagram illustrating an embodiment of Parent Columns and Identity Columns associated with matching criteria.

FIG. 6 is a data structure diagram illustrating an embodiment of Parent Columns and Identity Columns associated with matching criteria. In this example, a coverage pattern (e.g., autoglass) associated with a specific vehicle (e.g., VIN: 1234) is to be matched. In some embodiments, the given type of object to be matched on (e.g., autoglass coverage for vehicle with VIN: 1234) is specified by indicating the appropriate parent and identity columns. For example, because the coverage is associated with a particular vehicle (e.g., parent of coverage object under consideration), a foreign key to Personal Vehicles is specified as a parent column. In some embodiments an accompanying identity column indicating VIN 1234 is specified. In some embodiments, the foreign key refers to a specific Personal Vehicle in a Personal Vehicles table that has 1234 in the VIN column field, where the VIN column has been described in metadata as an identity column with which objects of type Personal Vehicles are to be matched on during the matching process. An identity column indicating the coverage pattern (e.g., autoglass) is then specified. In this way, the autoglass coverage specifically for Personal Vehicles with VIN 1234 will be matched on.

The following are examples of several insurance related scenarios in which matching is invoked to support higher level insurance related processes.

Conflict Detection: Resolving Duplicate Add

In some embodiments, a matcher is invoked to resolve conflicts due to duplicate additions of objects in a policy.

On Jan. 1, 2012, Bunta calls an insurance agent and creates a new policy that includes his first vehicle, a Toyota AE86, with both the policy and the Toyota AE86 personal vehicle having effective periods starting from Jan. 1, 2012 and ending (e.g., expiring) on Jan. 1, 2013.

FIG. 7A is an example of a first state of a Personal Vehicles Table. In this example, the Personal Vehicles Table shown is associated with Bunta's policy as of Jan. 1, 2012. In this example, a single row 702, representing Bunta's Toyota AE86 is included in the Personal Vehicles Table.

On Mar. 1, 2012, Bunta purchases a new vehicle, a Subaru Impreza 22B STi. The new 22B STi has an expected delivery date in the future on Jun. 1, 2012. Bunta would like to have coverage for his new 22B STi starting from the date it is delivered, and calls an insurance agent to have them add the new 22B STi to his policy, with its effective starting date specified as the future date of Jun. 1, 2012, and ending date specified as Jan. 1, 2013, to coincide with the expiration of his policy.

FIG. 7B is an example of a second state of a Personal Vehicles Table. In this example, the Personal Vehicles Table shown is associated with Bunta's policy as of Mar. 1, 2012. In this example, two rows (712 and 714), for Bunta's Toyota AE86 and newly added Subaru Impreza 22B STi (with policy period Jun. 1, 2012-Jan. 1, 2013) are included in the Personal Vehicles Table.

On May 1, 2012, however, Bunta learns that his new 22B STi will actually be delivered earlier than expected, on May 14, 2012. Bunta calls his insurance company, and is connected to an insurance agent who is different from the agent that previously assisted him. Unfortunately, the new insurance agent is unaware that the 22B STi had already been added in a previous job, and instead of modifying the effective period of the existing 22B STi on the policy, the insurance agent mistakenly assumes that Bunta would like to add a brand new car. In some cases, this may occur because the change Bunta would like to make is to a covered item that is not yet effective on the policy, and is therefore not displayed in a user interface to the agent when they look at the policy that is effective as of May 1, 2012 (Only the Toyota AE86 would appear as a covered item as of May 1, 2012), resulting in the insurance agent being unaware of the 22B STi that will become effective at a future date. In some embodiments, this type of modification comprises an Out-of-Sequence Endorsement (DOSE). However, if the changes were performed in an in-sequence order, after the 22B STi was effective (e.g., after Jun. 1, 2012), the insurance agent would have seen the 22B STi on the policy. However, because the agent mistakenly believes that Bunta would like to add a new car, the insurance agent re-collects and re-enters the information (e.g., coverages) for the 22B STi and adds the 22B STi as another new personal vehicle on Bunta's policy with an effective start date and end date of May 14, 2012 and Jan. 1, 2013, respectively.

FIG. 7C is an example of a third state of a Personal Vehicles Table. In this example, the Personal Vehicles Table shown is associated with Bunta's policy as of May 1, 2012. As shown in the Personal Vehicles Table example of FIG. 7C, there are now two copies of the same Subaru Impreza 22B STi's on Bunta's policy (i.e., there has been a duplicate addition). Furthermore, as the two copies of the 22B STi have overlapping effective periods, an overlap condition exists as well. The addition of a duplicate, in conjunction with the overlap condition, is an error that can result in serious ramifications (e.g., to quote) for Bunta's policy. For example, if the Personal Vehicles Table is left as shown in this figure, then after June 1, the policy system will determine that Bunta's policy covers three different vehicles, where there should only be two personal vehicles effectively being covered after June 1 (before 5/14 only coverage of the Toyota AE86 will appear as effective, while between 5/14 and 6/1, only the Toyota AE86 and the newly added Subaru Impreza 22B STi will appear as being covered, while after 6/1 all three vehicles in the Personal Vehicles Table will appear as being covered). This is an error that can have a severe impact on the rates that Bunta must pay, which may even invalidate his policy, and must be corrected or prevented from becoming effective (e.g., having invalid policy bound). In some embodiments, a correct version of Bunta's policy would show only the Toyota AE86 as being covered prior to 5/14, while at any point in time between 5/14 and Jan. 1, 2013, only two cars should appear as being covered (Toyota AE86 and Subaru Impreza 22B STi). In some embodiments, a matcher is invoked to resolve conflicts due to duplicate additions and overlap. For example, the matcher is invoked by a higher level process that consolidates duplicate items.

Figure 8A:
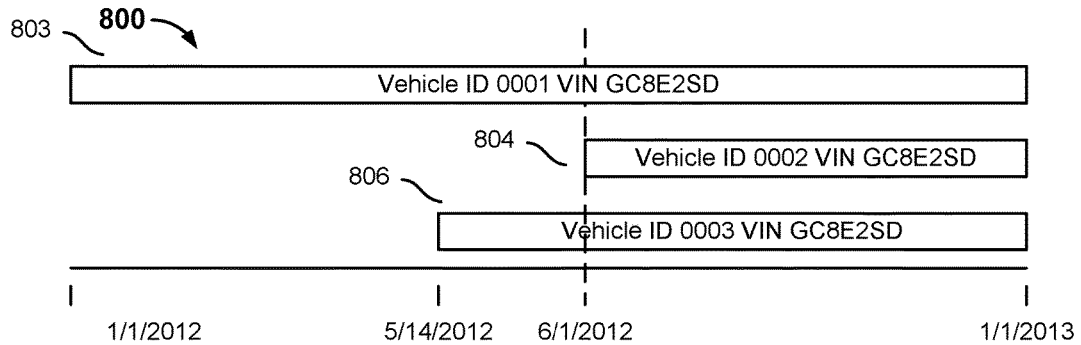
FIG. 8A is a timing diagram illustrating example states of effective periods of personal vehicles covered under a policy prior to vehicle consolidation.

FIG. 8A is a timing diagram illustrating example states of effective periods of personal vehicles covered under a policy prior to vehicle consolidation. In this example, the timing diagram of FIG. 8A corresponds to the state of the Personal Vehicles Table shown in FIG. 7C. In this example, prior to 5/14 only the Toyota AE86 will appear as being covered under the policy, while between 5/14 and 6/1, only two vehicles (the Toyota AE86 and the newly added Subaru Impreza 22B STi) will appear as being covered, while after 6/1 all three vehicles in the Personal Vehicles Table will appear as being covered. Although Bunta and the insurance may recognize that there should only be one Subaru Impreza 22B STi, due to the processing performed by the insurance agent, the policy system recognizes three different vehicles.

In some embodiments, a modification to a policy is made to an existing graph. For example, the duplicate 22B STi is added to the existing graph including the original 22B STi. In some embodiments, when a modification (e.g., addition) to an existing graph is made, a copy of the existing graph and associated information is created, and any modifications are made to the copy.

In some embodiments, a change to an existing policy is treated as a new addition to the policy by the policy system and requires re-entering information by a user, where the matching engine is automatically deployed to resolve any potential data conflicts that may arise due to the change/addition. In some embodiments, a user is informed that the object they are adding is in fact a duplicate of an object that already exists on the policy. In some embodiments, the user is prompted to double-check their information or to discard the changes.

In some embodiments, prior to the modified policy graph and any modifications being bound, a matcher is employed to identify any duplicate objects that may exist and whether they have overlapping effective periods. In this example, a matcher is invoked to identify that duplicate copies of the Subaru Impreza 22B STi exist and that they have overlapping periods.

In some embodiments, the process described in FIG. 5 is used. For example, the matching engine obtains the modified graph including both 22B STi vehicles.

A set of matching criteria is then obtained. In this example, a type of object is specified (Personal Vehicle), no Parent Columns are specified (because Personal Vehicle does not have a parent or foreign key), and the identity Column includes the VIN of the personal vehicle to be matched. For example, matching criteria associated with the newly added 22B STi is obtained (e.g., with VIN of newly added 22B STi specified as an identity column)

It is then determined whether duplicate personal vehicles exist in the policy graph in effective time using the matching criteria. For example, all Personal Vehicles in the policy graph are compared with the matching criteria specified for the newly added 22B STi over effective time to determine whether the newly added vehicle matches any existing vehicle in the graph (i.e., whether there are any duplicates of the newly added item)

In this example, the matching process determines that Vehicle ID 0002 (newly added 22B STi with an effective policy start date of 5/14) matches another vehicle in the policy forward in effective time (22B STi with an effective policy start date of 6/1 with Vehicle ID 0003).

In some embodiments, it is determined whether the identified matched objects have overlapping effective periods. In some embodiments, the determination is performed subsequently or concurrently with the matching process. In some embodiments, the matcher performs matching over effective time, checking at each point in time whether duplicate vehicles are effective under the policy and being covered simultaneously (i.e., overlap). For example, after 6/1, duplicate 22B STis exist in effective time; however, between 5/14-6/1, no duplicate vehicles exist in effective time, since only coverage for one 22B STi is in force during that period. In some embodiments, an overlap condition is checked by comparing the effective start and end date fields of duplicate objects. In some embodiments, an overlap condition is determined by comparing the effective periods (or effective start and end dates) of the matched objects. In some embodiments, the duration of overlap is determined. In this example, it is determined that Vehicle ID 0002 and Vehicle ID 0003 match and have overlapping periods. In this example, it is determined that the two matching personal vehicles overlap from Jun. 1, 2012-Jan. 1, 2013.

In some embodiments, in the event that it is determine that the matched objects have overlapping effective periods, the effective period(s) of at least one of the matched objects is modified such that the matched objects no longer overlap. In some embodiments, the newly added object or changed object is selected to be modified.

Figure 8B:
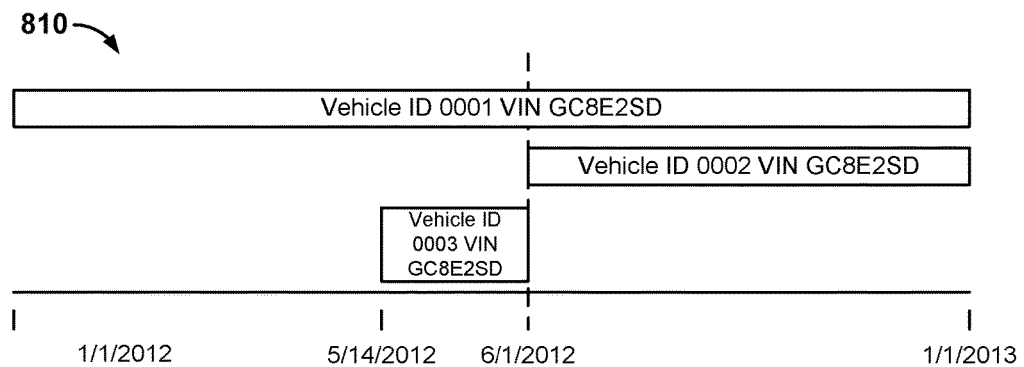
FIG. 8B is a timing diagram illustrating example intermediary states of the effective periods of personal vehicles covered under a policy where the effective period of a personal vehicle has been modified during vehicle consolidation.

FIG. 8B is a timing diagram illustrating example intermediary states of the effective periods of personal vehicles covered under a policy where the effective period of a personal vehicle has been modified during vehicle consolidation. In the example of Bunta's policy, the effective period of the newly added 22B STi is modified so that its effective period is from May 14, 2012-May 31, 2012.

Figure 8C:
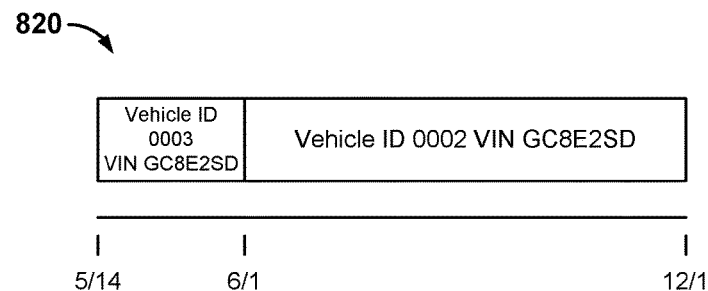
FIG. 8C is a timing diagram illustrating example final states of non-overlapping effective periods for two personal vehicles that have been consolidated.

FIG. 8C is a timing diagram illustrating example the final states of non-overlapping effective periods for two personal vehicles that have been consolidated. Now that the newly added 22B STi's effective period has been modified, when traversing through the policy over effective time (e.g., looking at what is being covered at a specific point in time), only one copy of the Subaru Impreza 22B STi appears to be covered under the policy from May 14, 2012-Jan. 1, 2013. In this example, even though there appears to be a single 22B STi on the policy throughout effective time, there exist two versions of the 22B STi, described in two rows in the Personal Vehicles Table, one with Vehicle ID 0002 and effective period Jun. 1, 2012-Jan. 1, 2013, and another with Vehicle ID 0003 and effective period May 14, 2012-May 31, 2012. In some embodiments, for matched objects, discrepancies in other fields (e.g., color of 22B STi re-entered incorrectly by agent) associated with the matched objects are determined and are automatically corrected, or a notification is provided, indicating the discrepancies to a user. In some embodiments, an action is provided to the user to resolve the discrepancies.

In some embodiments, after the duplicate addition/overlap conditions and conflicts are resolved (i.e., through error checking and error resolution) and approved by the agent and the customer, the modified policy graph is bound and made effective as the current state of Bunta's policy.

Conflict Resolution—Pre-Emption

In some embodiments, a matcher is invoked to prevent duplicate or similar modifications/additions to the same policy from being bound. Pre-emption occurs, for example, when two changes, Change A and Change B, are being bound to the same existing policy at times close to each other. If one of the changes, for example, Change A "wins" and is bound first, then the other change, Change B has been "pre-empted" in this scenario by the first change. Therefore, the user that was attempting to bind the second change (Change B) must now resolve any conflicts (e.g., duplicate objects) between their changes and the already bound changes of Change A. Only after conflicts are resolved can they then move forward and bind their changes.

In this example, Ayrton and Brenda are married and have a joint auto policy. In addition, they have recently purchased a new personal vehicle, a Honda NSX Type-R, and wish to add it to their joint auto policy. Unbeknownst to the other, they each call the insurance company when they arrive at work at 8 AM on the same day to add the NSX Type-R to their policy. Ayrton speaks with Agent Applegate and Brenda speaks with Agent Baker. In their separate conversations, they each tell their respective agent the details on the car, except Ayrton claims the car was bought for $50,000, while Brenda claims the car was bought for $60,000. Ayrton completes his call first, and Agent Applegate binds the policy with the new NSX Type-R with a purchase price of $50,000. Brenda finishes her call with Agent Baker 15 minutes later, except that instead of Agent Baker being able to bind the policy, she is given a notification and is informed that she cannot bind the policy because she was pre-empted by the change made by Agent Applegate. Agent Baker must now resolve any data conflicts due to inconsistencies in data entered for the vehicle on behalf of Ayrton and Brenda.

In some embodiments, a matcher is invoked to identify that a duplicate addition is being attempted by Agent Baker. For example, the matcher is invoked when Agent Baker attempts to add Brenda's NSX Type-R. The matcher obtains the policy that is being modified. Merge criteria are obtained, including a Personal Vehicle Type specified, an empty set of Parent Columns (because in some embodiments, Personal vehicles are top level objects and do not have parents or foreign keys), and a set of Identity Columns including the VIN for the NSX Type-R, to determine whether a duplicate of the NSX Type-R already exists in the policy. Based on the determination that the vehicle already exists, Agent Baker's change to the policy is no longer an addition of a new car, but is now treated as modification of the existing car that Agent Applegate added a few minutes ago. For example, any information that Agent Baker entered regarding the new vehicle is considered a modification to corresponding information already entered by Agent Applegate. In some embodiments, the information entered by Agent Baker is compared to the existing policy information to determine if there are any data conflicts. For example, due to Ayrton claiming a purchase price of $50,000 for the vehicle while Brenda claimed a purchase price of $60,000. Agent Baker must now determine which of these values is correct. For example, Agent Baker talks to both Ayrton and Brenda and discovers that Brenda was correct, and that the actual price of the NSX Type-R was $60,000, and so Agent Baker should go ahead and bind this change to the policy to reflect the correct purchase price.

Merger

In some embodiments, a matcher is invoked to facilitate merging of insurance related policy objects.

In some embodiments, merging insurance related policy objects includes recursively merging child objects in the hierarchical graphs which have the objects to be merged as the roots of the hierarchical graphs. In some embodiments the graphs to be merged comprise sub-graphs of policy graphs. In some embodiments, one graph is designated as a master graph, into which the other graphs will be merged. In some embodiments, the master graph comprises a surviving graph of the merging process.

In some embodiments, if a merge is performed on hierarchical graphs, the merge is performed at each level of the graphs being merged. In some embodiments, only objects at levels indicated to be merged by merge criteria are merged. In some embodiments, merge criteria indicate rules for merging (e.g., how objects and graphs should be merged), whether objects at a specific level should be merged, or any other appropriate criteria for merging.

In some embodiments, when performing a merge at a particular level in a master graph and a second graph, it is determined whether each of the objects in that particular level of the second graph matches any of the objects at the corresponding level in the master graph. In some embodiments, a matcher is invoked to determine whether the object from the second graph matches any objects in the master graph at the corresponding level. In some embodiments, if an object in the second graph at the particular level does not match any of the objects in the master graph at the corresponding level, then the second graph object is included in (e.g., merged into) the master graph. In some embodiments, including the second graph object comprises including child objects of the second graph object. In some embodiments, if the second graph object at a particular level matches an object in the corresponding level of the master graph, then the merge process walks down the graphs to the children level of the matching objects and performs the merge process on the children. This recursive merge process continues until an end merge condition is met (e.g., no remaining objects in graphs to be merged).

Figure 9:
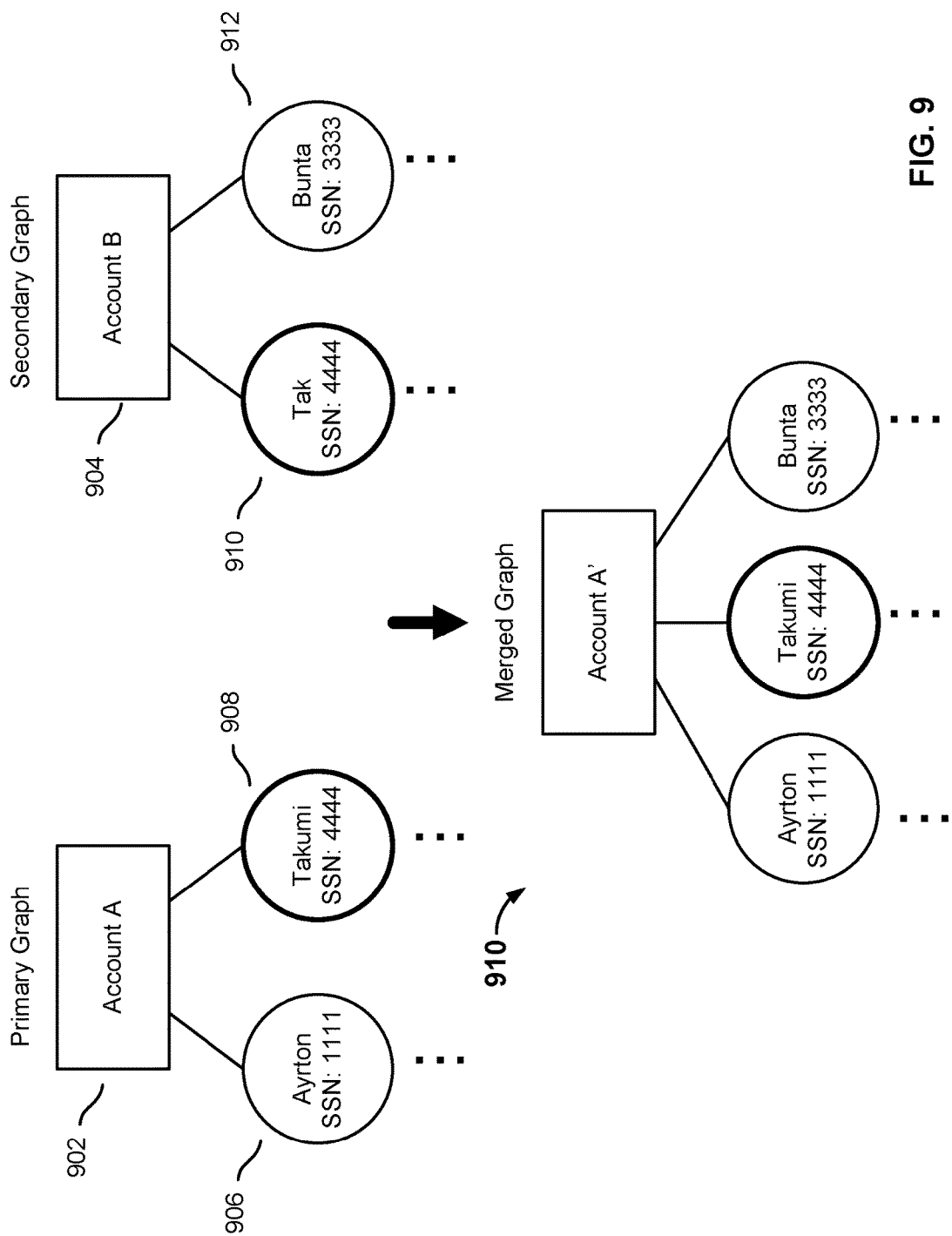
FIG. 9 is a diagram illustrating an example of objects and associated hierarchical graphs to be merged.

FIG. 9 is a diagram illustrating an example of objects and associated hierarchical graphs to be merged. In some embodiments, the objects to be merged are from different policies (e.g., merging two policies together). In some embodiments, objects to be merged are from the same policy (e.g., two contacts for the same person were created due to data entry error). In some embodiments, the objects to be merged are manually specified as input (e.g., by a customer or insurance agent) to a merger or are automatically specified as input. In this example, the Account Contacts objects under Account A 902 and Account B 904 and their associated graphs are to be merged. In this example, Accounts B 904 is to be merged into Accounts A 902. In some embodiments, Accounts A 902 comprises a surviving account.

In this example, merge criteria have indicated that objects of the account contact objects type are to be merged based on SSN (specified as an identity column). Because account contact objects do not have parents, no Parent Columns are specified. In some embodiments, matching is invoked on objects that are indicated to be merged. In some embodiments, if objects are not indicated to be merged, then no matching is invoked.

In this example, contacts objects 910 and 912 are each compared to contacts objects 906 and 908 to determine if there are any matches. In some embodiments, a match is determined using matching criteria (e.g., parent and identity columns). In this example, no parent columns are specified for Account Contacts object types because they are considered top level objects that are uniquely identified by Social Security Number (SSN), which is specified as an identity column. In this example, even though the names associated with objects 908 and 910 are not the same (e.g., due to misspelling, nickname used, etc.), the two objects are determined to be matched based on the SSNs being matched. Because the two objects match, object 910 is not merged into Account A 902, which has been designated as the primary Account which will survive the merging process. However, in some embodiments, in the event that each of contacts objects 908 and 910 are associated with child objects (e.g., sub-graphs with the account contacts objects 908 and 910 as roots), then merge process is invoked recursively on the children with merge criteria specified for the children. Additionally, because object 908 will survive, the name associated with the object will be "Takumi" instead of "Tak." With regard to object 912, because the merger determined, based on the matching criteria, that object 912 did not match any object at that account contacts level in the graph associated with Account A 902, Account Contacts object 912 is included in the surviving graph. Based on the merging process described above, a final merged graph including 3 unique account contacts is shown.

Side-by-Side Insurance Policy Quoting

In some embodiments, a matcher is invoked to facilitate side-by-side insurance policy quoting.

In some embodiments, side-by-side insurance policy quoting allows for a plurality of versions of an insurance policy to be created and displayed side-by-side. For example, in the process of purchasing an insurance policy, a customer may wish to consider different coverage options or different vehicles for an automotive policy.

Side-by-Side Insurance Policy Quoting: Base Data Copy

In some embodiments, the various versions of the policy include base data and variable data. In some embodiments, base data refers to data that is shared and is the same across different versions (e.g., policy period, contact information, etc.), and variable data refers to data that is not necessarily the same across different versions (e.g., coverages). In some embodiments, the separation of base data and variable data allows an insurance system to more efficiently manage different versions of the insurance policy and generate quotes.

In some embodiments, when a piece of base data is modified in one version of the policy, it can be automatically updated in the other versions of the policy. For example, when a user (e.g., insurance agent or customer) saves a change to data in one version of the policy, where the data is considered to be base data that should apply to all the versions, the user is prompted with the option to copy the base data to the other versions of the quote set. In some embodiments, copying of base data from one version of the policy to the other versions of the policy in the quote set is performed automatically. In some embodiments, each of the versions of the policy is associated with a policy graph. In some embodiments, copying of base data is done by traversing the policy graphs. In some embodiments, when there are changes to base data in one of the underlying policy periods, the change is copied to other policy periods. In some embodiments, the copying is transparent to the user. In some embodiments, entities are created or removed as necessary so that the base data appears to be shared among different versions of the insurance policy when displayed side-by-side in a user interface.

In some embodiments, a matcher is invoked to ensure that when a change to base data in one version of the policy is committed or made (e.g., saved), that change is propagated to and replicated in the other versions of the policy as well. In some embodiments, applying the change includes traversing each of the graphs/trees associated with each of the versions of the policy one level at a time to compare the policy versions and determine differences in base data between the policy versions at that particular level with respect to the version of the policy that the change was originally applied to (e.g., the source of the base data change).

Figure 10:
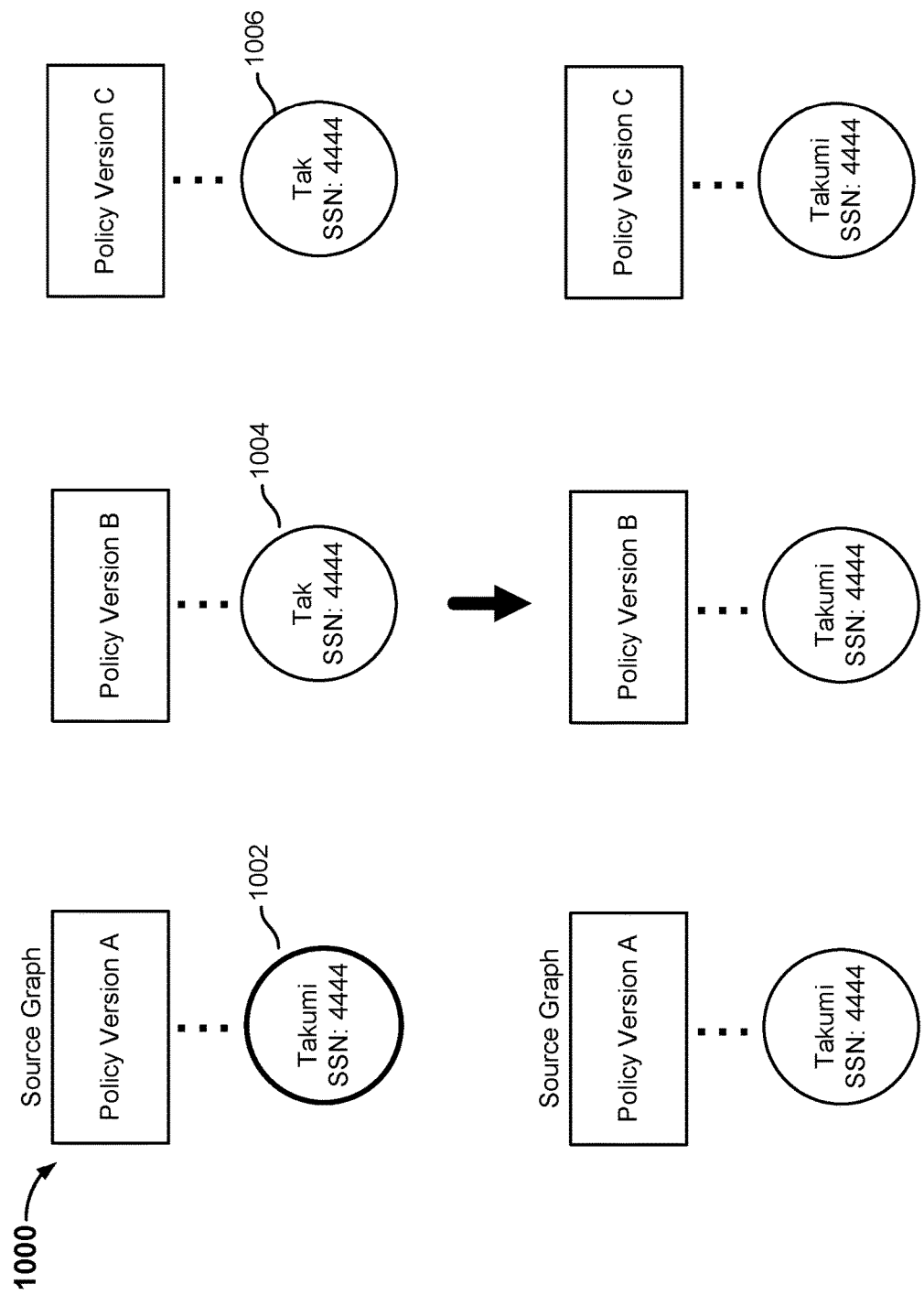
FIG. 10 is an example illustrating a plurality of versions of a policy.

FIG. 10 is an example illustrating a plurality of versions of a policy. In this example, a change was made in Version A of the policy to the name base data associated with account contacts object 1002, from "Tak" to "Takumi." The change must now be replicated to policy versions B and C. In some embodiments, a matcher is invoked to identify what base data in the corresponding versions of the policy needs to change so that the base data is the same across all versions of the policy. In some embodiments, more than one change is made to a policy and the location of the base data that the changes apply to must be identified in the corresponding versions of the policy. In this example, the three policy graphs corresponding to policy versions A, B, and C are obtained. In this example, matching criteria are specified. For example, because the system recognizes that the account contacts object associated with Takumi in Version A has had its associated "name" base data field changed, the merge criteria indicate that objects of type "account contacts" are to be merged, that the corresponding set of parent columns is empty (because account contact objects are a top level object), while the corresponding set of identity columns includes an SSN: 4444 (without including a name field to match on). As the three policy graph versions are traversed from one level to the next, when the account contacts level is reached, the matcher will return the objects from each graph that are associated with an SSN of 4444 based on the specified matching criteria. The returned objects (and associated database entries) can then have their name fields modified and made identical to "Takumi," as in Version A, which was the source of the base data change.

Side-by-Side Insurance Policy Quoting: Display

In some embodiments, a matcher is invoked to support the side-by-side display of multiple versions of an insurance policy. In some embodiments, to support the side-by-side display of multiple versions of an insurance policy that cover different items, a matcher is invoked to identify matching items. For example, when quotes for the multiple versions are generated, the policy versions are displayed side-by-side, where the matching items are aligned (e.g., displayed in the same row or column).

FIG. 11 is an example user interface displaying three policy versions. In this example, Bunta is considering three different versions of an insurance policy that he would like to purchase. In some embodiments, because each version of the policy is associated with database tables and structures that store policy related information specific to that particular version of the policy, a matcher is invoked to identify matching items. For example, Version A of the policy will have a single policy driver Bunta included in the Policy Driver table, a Personal Vehicles table that includes only the Toyota AE86, and a single vehicle driver Bunta included in the Vehicle Drivers Join table. Version B however, will have two rows in the Policy Driver table corresponding to Bunta and Takumi, a Personal Vehicles table that includes both a Toyota AE86 and a Subaru Impreza 22B STi. Furthermore, in some embodiments, Version B has two Vehicle Driver join tables, one for each vehicle, where the Vehicle Driver Table for the Toyota AE86 includes two rows corresponding to Bunta and Takumi, while the second Vehicle Driver table includes only a single row for Bunta. Version C's database tables and information may also be structured and organized differently (e.g., since it has two policy drivers) from Versions A and B.

Although the information corresponding to the different versions of the policy may be stored and organized differently in a database (e.g. with different tables or in different orders), when displayed in the UI, it would be beneficial to see matching items aligned (e.g., displayed in the same row or column). For example, a customer might prefer to see that the order of drivers for the Toyota AE86 in Version B of the policy is Bunta before Takumi, so that looking horizontally across all policy versions, Bunta is in the same row. In some embodiments, this functionality is supported by invoking a matcher.

For example, the ordering of how Versions B and C are displayed may be done with respect to how Version A is displayed. Version A includes only the Toyota AE86, so that vehicle is displayed in the first vehicle row. However, Version B includes two vehicles. In order to ensure that the Toyota AE86 will be displayed in the first row so that it is in line with Version A's Toyota AE86, the matcher is invoked. For example, the graphs corresponding to Policy Versions A and B are obtained by the matcher. The matching criteria are specified such that the type of object to be matched is Personal Vehicles Type, while the set of parent columns is empty (because Personal Vehicles is a top level object with no parent), while the identifying column includes the VIN for the Toyota AE86. In this way, the matching Toyota AE86 in Version B of the policy will be found and returned using the matcher, so that it can be displayed first in Version B and will be aligned with the Toyota AE86 in Version A. The matcher can be similarly invoked such that Bunta (e.g., matching criteria specifying Vehicle Driver Type, SSN) is found first to be displayed in Version B so that it is in line with the Bunta of Version A.

Duplicate Policy Detection and Resolution

In some scenarios, a matcher may be invoked to determine that two seemingly unrelated policies that were bound at different times are similar. For example, two different policies may cover the same items for the same people. In some embodiments, a matcher is invoked using appropriate matching criteria, and based on the determination that two policies are identical or similar, provide further actions, such as notifying holders of the policies of the potential conflict and/or merging the two policies together (e.g., if the number of certain types of matching objects exceeds a threshold value).

Copier

In some scenarios, information included in one policy may be copied into another policy. In some scenarios, such as those involving large commercial policies in which many insurance related objects are moving from one policy to another (e.g., rental cars moving from one subsection of a state to another), many insurance agents could potentially be working on the policies, resulting in partial data transfers (e.g., one agent entered information manually, while another agent performed an automatic copy) and duplicates of data potentially being copied over. In some embodiments, similar to the situation arising due to duplicate additions, a matcher is invoked to ensure that duplicate objects and data are not copied from one policy to another. In some embodiments, objects in the graphs associated with the policies are determined to be duplicates based on specified matching criteria.

Differentiator

In some scenarios, when viewing multiple versions of a policy (for example, to see how the policy looked at the beginning of the year versus the end of the year), it may be beneficial to view only the differences between the versions (e.g., what has changed over time). In some embodiments, a matcher is invoked to determine the corresponding objects in the graphs of the policy versions that match (according to specified matching criteria) so that they are not displayed and only the differences between the versions are shown.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
obtain one or more hierarchical graphs representing one or more insurance policies, wherein a hierarchical graph among the one or more hierarchical graphs comprises a hierarchical data structure including a plurality of insurance policy-related objects associated with a corresponding insurance policy;
for a given type of insurance policy-related object, obtain a set of matching criteria specified for the given type of insurance policy-related object, wherein the set of matching criteria specified for the given type of insurance policy-related object includes a key generated based at least in part on information associated with the given type of insurance policy-related object, a set of parent columns, and a set of identity columns, wherein:
a parent column specifies a parent entity of the given type of insurance policy-related object; and
an identity column specifies an identifier associated with the given type of insurance policy-related object;
determine whether a first key generated for a first insurance policy-related object and a second key generated for a second insurance policy-related object match, wherein the first insurance policy-related object is included in a first hierarchical graph, and wherein the second insurance policy-related object is in the first hierarchical graph or in a second hierarchical graph different from the first hierarchical graph;
in response to a determination that the first generated key and the second generated key match, determine whether the first insurance policy-related object and the second insurance policy-related object match based at least in part on the set of parent columns and the set of identity columns; and
perform one or more actions based at least in part on the determination of whether the first and second insurance policy-related objects match, wherein the one or more actions include:
causing representations of at least one of the first and second insurance policy-related objects to be automatically displayed in a graphical user interface, wherein the display of the representations of the at least one of the first and second insurance policy-related objects in the graphical user interface is based at least in part on the determination of whether the first and second insurance policy-related objects match.

2. The system recited in claim 1, wherein the determination of whether the first insurance policy-related object and the second insurance policy-related object match is based at least in part on a search of parent columns and identifiers in the set of parent columns and the set of identity columns in a database.

3. The system recited in claim 1, wherein matching criteria are indicated in metadata.

4. The system recited in claim 1, wherein obtaining the one or more-hierarchical graphs is invoked in response to a user interaction.

5. The system recited in claim 4, wherein the user interaction includes a request for a new policy.

6. The system recited in claim 1, wherein in response to determining that the first and second insurance policy-related objects match, the memory is further configured to provide the processor with instructions which when executed cause the processor to:
provide as output the matching insurance policy-related objects.

7. The system recited in claim 1, wherein in response to determining that the first and second insurance policy-related objects match, the memory is further configured to provide the processor with instructions which when executed cause the processor to:
determine that the first and second insurance policy-related objects are duplicates; and
determine whether the first and second insurance policy-related objects overlap in effective time.

8. The system recited in claim 7, wherein in response to determining that the first and second insurance policy-related objects overlap in effective time, the memory is further configured to provide the processor with instructions which when executed cause the processor to:
  resolve the overlap at least in part by modifying an effective period of at least one of the first and second insurance policy-related objects.

9. The system recited in claim 1, wherein in response to determining that the first and second insurance policy-related objects match, the memory is further configured to provide the processor with instructions which when executed cause the processor to:
  determine that insurance policies corresponding with the first and second insurance policy-related objects comprise duplicate policies.

10. The system recited in claim 1, wherein in response to determining that the first and second insurance policy-related objects do not match, the memory is further configured to provide the processor with instructions which when executed cause the processor to:
  merge the first and second insurance policy-related objects.

11. The system recited in claim 1, wherein the one or more hierarchical graphs comprise one or more versions of an insurance policy, wherein the second insurance policy-related object is included in a second version of the insurance policy, wherein the determination of whether the second insurance policy-related object matches the first insurance policy-related object includes traversing a hierarchical graph corresponding to the second version of the insurance policy including the second policy-related related object to identify matching base data, wherein each of the one or more hierarchical graphs include base data that is shared across the one or more versions of the insurance policy, and wherein the memory is further configured to provide the processor with instructions which when executed cause the processor to:
  receive modification information associated with at least a portion of the base data associated with a first version of the insurance policy; and
  save the modification information in the first version of the insurance policy.

12. The system recited in claim 1, wherein in response to determining that the first and second insurance policy-related objects do not match, the memory is further configured to provide the processor with instructions which when executed cause the processor to:
  copy the first insurance policy-related object to an insurance policy associated with the second insurance policy-related object.

13. The system recited in claim 1, wherein in response to determining that the first and second insurance policy-related objects do not match, the memory is further configured to provide the processor with instructions which when executed cause the processor to:
  present the first and second insurance policy-related objects.

14. A method, comprising:
  obtaining one or more hierarchical graphs representing one or more insurance policies, wherein a hierarchical graph among the one or more hierarchical graphs comprises a hierarchical data structure including a plurality of insurance policy-related objects associated with a corresponding insurance policy;
  for a given type of insurance policy-related object, obtaining a set of matching criteria specified for the given type of insurance policy-related object, wherein the set of matching criteria specified for the given type of insurance policy-related object includes a key generated based at least in part on information associated with the given type of insurance policy-related object, a set of parent columns, and a set of identity columns, wherein:
  a parent column specifies a parent entity of the given type of insurance policy-related object; and
  an identity column specifies an identifier associated with the given type of insurance policy-related object;
  determining, using a processor, whether a first key generated for a first insurance policy-related object and a second key generated for a second insurance policy-related object match, wherein the first insurance policy-related object is included in a first hierarchical graph, and wherein the second insurance policy-related object is in the first hierarchical graph or in a second hierarchical graph different from the first hierarchical graph;
  in response to a determination that the first generated key and the second generated key match, determining whether the first insurance policy-related object and the second insurance policy-related object match based at least in part on the set of parent columns and the set of identity columns; and
  performing one or more actions based at least in part on the determination of whether the first and second insurance policy-related objects match, wherein the one or more actions include:
  causing representations of at least one of the first and second insurance policy-related objects to be automatically displayed in a graphical user interface, wherein the display of the representations of the at least one of the first and second insurance policy-related objects in the graphical user interface is based at least in part on the determination of whether the first and second insurance policy-related objects match.

15. A computer program product embodied in a non-transitory computer readable storage medium and comprising computer instructions for:
  obtaining one or more hierarchical graphs representing a one or more insurance policies, wherein a hierarchical graph among the one or more hierarchical graphs comprises a hierarchical data structure including a plurality of insurance policy-related objects associated with a corresponding insurance policy;
  for a given type of insurance policy-related object, obtaining a set of matching criteria specified for the given type of insurance policy-related object, wherein the set of matching criteria specified for the given type of insurance policy-related object includes a key generated based at least in part on information associated with the given type of insurance policy-related object, a set of parent columns, and a set of identity columns, wherein:
  a parent column specifies a parent entity of the given type of insurance policy-related object; and
  an identity column specifies an identifier associated with the given type of insurance policy-related object;
  determining whether a first key generated for a first insurance policy-related object and a second key generated for a second insurance policy-related object match, wherein the first insurance policy-related object is included in a first hierarchical graph, and wherein the second insurance policy-related object is in the first hierarchical graph or in a second hierarchical graph different from the first hierarchical graph;
  in response to a determination that the first generated key and the second generated key match, determining whether the first insurance policy-related object and the second insurance policy-related object match based at least in part on the set of parent columns and the set of identity columns; and performing one or more actions based at least in part on the determination of whether the first and second insurance policy-related objects match, wherein the one or more actions include:

causing representations of at least one of the first and second insurance policy-related objects to be automatically displayed in a graphical user interface, wherein the display of the representations of the at least one of the first and second insurance policy-related objects in the graphical user interface is based at least in part on the determination of whether the first and second insurance policy-related objects match.

16. The system recited in claim 1, wherein in response to determining that the first and second insurance policy-related objects match, the memory is further configured to provide the processor with instructions which when executed cause the processor to:

align the display of the first and second insurance policy-related objects in the graphical user interface.

17. The system recited in claim 1, wherein the first generated key is derived based at least in part on a hash of information associated with the first insurance policy-related object.

18. The system recited in claim 1, wherein in response to determining that the first generated key and the second generated key do not match, the memory is further configured to provide the processor with instructions which when executed cause the processor to:

determine that the first and second insurance policy-related objects do not match.

\* \* \* \* \*

UNITED STATES PATENT AND TRADEMARK OFFICE
CERTIFICATE OF CORRECTION

PATENT NO. : 10,176,172 B1
APPLICATION NO. : 13/432781
DATED : January 8, 2019
INVENTOR(S) : Clarke et al.

Page 1 of 1

It is certified that error appears in the above-identified patent and that said Letters Patent is hereby corrected as shown below:

In the Specification

In Column 11, Line 56, delete "(DOSE)." and insert --(OOSE).--, therefor.

Signed and Sealed this
First Day of October, 2019

Andrei Iancu
*Director of the United States Patent and Trademark Office*